United States Patent [19]

Gausmann et al.

[11] Patent Number: 5,230,073
[45] Date of Patent: Jul. 20, 1993

[54] SYSTEM AND METHOD FOR ACCESSING AND UPDATING A CONTINUOUSLY BROADCASTED STORED DATABASE

[75] Inventors: Eric J. Gausmann, Downers Grove, Ill.; Kalwant S. Grewal, Washington Township, Morris County; Gary E. Herman, South Orange, both of N.J.

[73] Assignee: Bell Communications Research, Inc., Livingston, N.J.

[21] Appl. No.: 363,298

[22] Filed: Jun. 6, 1989

Related U.S. Application Data

[63] Continuation of Ser. No. 888,733, Jul. 21, 1986, abandoned.

[51] Int. Cl.$^5$ .............................................. G06F 15/40
[52] U.S. Cl. ................................. 395/600; 364/271; 364/228.1; 364/282.1; 364/260; 364/DIG. 1
[58] Field of Search ... 364/200 MS File, 900 MS File; 340/825.5, 825.51, 825.52; 395/600

[56] References Cited

U.S. PATENT DOCUMENTS

| | | | |
|---|---|---|---|
| 4,047,159 | 9/1977 | Boudry | 364/200 |
| 4,208,724 | 6/1980 | Rattlingourd | 364/900 |
| 4,276,656 | 6/1981 | Petryk, Jr. | 340/347 DD |
| 4,298,954 | 11/1981 | Bigelow et al. | 364/900 |
| 4,393,404 | 7/1983 | Cox | 358/147 |
| 4,501,021 | 2/1985 | Weiss | 370/88 |
| 4,509,073 | 4/1985 | Baran | 358/86 |
| 4,528,675 | 7/1985 | Esterling et al. | 340/825.48 |
| 4,584,719 | 4/1986 | Miller | 364/900 |
| 4,600,921 | 7/1986 | Thomas | 340/825.31 |
| 4,630,254 | 12/1986 | Tseng | 370/1 |
| 4,646,229 | 2/1987 | Boyle | 364/200 |
| 4,651,318 | 3/1987 | Luderer | 370/60 |
| 4,654,654 | 3/1987 | Butler | 370/94.1 |
| 4,710,870 | 12/1987 | Blackwell et al. | 364/200 |
| 4,714,995 | 12/1987 | Materna | 364/200 |
| 4,715,026 | 12/1987 | Eberspaecher | 370/1 |
| 4,731,878 | 3/1988 | Vaidya | 370/1 |
| 4,745,559 | 5/1988 | Willis et al. | 364/514 |
| 4,747,130 | 5/1988 | Ho | 364/200 |
| 4,748,658 | 5/1988 | Gopal et al. | 379/221 |
| 4,763,317 | 8/1988 | Lehman | 370/60 |
| 4,774,664 | 9/1988 | Campbell et al. | 364/400 |
| 4,799,156 | 1/1989 | Shavit et al. | 364/401 |
| 4,876,643 | 10/1989 | McNeill | 364/200 |

OTHER PUBLICATIONS

Mitre Corporation Working Paper 21668, "Management Plan and Description for the Common File Demonstration System Implementation" Mar. 10, 1978.
Mitre Corporation Working Paper 21580, "Common File Demonstration System Description".
Mitre Corporation Working Paper 21330, "Common File Data Processing Equipment".
Mitre Corporation Working Paper "Context for the Common File Computer Equipment Organization".
Leslie Lamport, "Concurrent Reading and Writing", Communication of the ACM, Nov. 1977, vol. 20, No. 11.
Network Control System Using Traffic Databases, K. Mase, 1982 IEEE.
J. St. Amand, "A Common File Approach to Data Processing," Proc. Trends and Applications, 1978 Distributed Processing Symposium, Gaithersburg, Md., May 18, 1978.
"The content addressable file store-CAFS", ICL Technical Journal, V. A. J. Maller, Nov. 1979, pp. 265-279.

*Primary Examiner*—Thomas C. Lee
*Assistant Examiner*—Eric Coleman
*Attorney, Agent, or Firm*—Leonard Charles Suchyta

[57] ABSTRACT

A broadcast oriented architecture for a data storage access system is disclosed. The architecture permits the implementation of high capacity query intensive data bases for mass market public applications such as directory assistance systems. In the architecture, a record storage pump cyclically transmits the entire data base over a downstream channel formed from a transmission medium such as an optical fiber. Record retrieval elements located at different positions along the downstream channel read the entire data base during each cycle and pick out requested records from the data base. An upstream channel between the record retrieval elements and the record storage pump is used to transmit data base update information from the record retrieval elements to the record storage pump to provide each record retrieval element with a consistent view of the updated data base during subsequent data base broadcast cycles.

2 Claims, 6 Drawing Sheets

SYSTEM AND METHOD FOR ACCESSING AND UPDATING A CONTINUOUSLY BROADCASTED STORED DATABASE

This application is a continuation of application Ser. No. 06/888,733, filed Jul. 21, 1986 now abandoned.

FIELD OF THE INVENTION

This invention relates to an architecture for a data storage access system which permits implementation of high performance multiprocessor computer systems, including the very high capacity query intensive data bases required for mass market applications.

BACKGROUND OF THE INVENTION

Storage access systems are designed for extracting needed information (e.g. user data files, programs, or data base records) from large volumes of stored data in response to user or application needs. Such storage access systems have a wide variety of applications including computer workstation networks, and large, high performance multiprocessor general purpose computing systems. Such storage access systems are also useful for providing high throughput inquiry-response database-systems for service control points in public communications networks, large video-text systems, directory assistance systems, and airline reservation systems.

Typically, a general purpose computer system for inquiry-response data base or other applications comprises a central processor. At the front end, the central processor interfaces with the users who generate inquiries or otherwise interact with applications being executed in the central processor. At the back end the central processor interfaces with storage devices which store the user files, programs and/or a data base containing records to be accessed in response to user requests.

Illustratively, the storage devices are magnetic disks. If a data base is stored, either on disk or in the local memory of the central processor an index may be provided so that the central processor knows where in the data base to look for particular records required to respond to particular inquiries. Similarly, directories or other tables may be provided to indicate where relevant data files or programs are stored.

The design of high performance data base or application-processing systems—i.e. those with high transaction volumes accessing very large storage volumes with stringent response time criteria—is limited by two major factors. These are processor real time and the time required for physical access to storage.

Processor real time becomes a resource limit when the central processor or other processing unit in the system cannot execute instructions rapidly enough to respond to user requests in a reasonable period of time. Processor real time is required to execute instructions for front end operations (communications with users) and back-end operators (communications with storage devices). Processor real time is also required to interpret each incoming inquiry to specify the required records, files or programs, and once the required records, files or programs have been obtained, to process the records, files or programs to determine the appropriate response.

The processor real time requirements for each inquiry-response transaction severely limits the number of inquiry-response transactions that can be handled per second using the central processor dominated application processing system architecture described above. For this type of system, transaction handling capacity may be increased by using higher performance processing elements and/or by adding processing elements in series (e.g. a front end processor) to off load the main processor and/or by adding main processors in parallel to share the processing load. Since modular, multiprocessor configurations permit the assembly of very large amounts of processing capacity to execute applications in parallel, physical access to storage and control over modifications to storage by the several parallel processing elements are often important elements in creating very high capacity inquiry-response data storage access systems or application processing systems.

With higher performance processors or with multiprocessor configurations, physical access to storage can become a system bottleneck. Illustratively, physical access to records stored on magnetic disk systems is limited by the time required for the disk head to "seek" to the desired cylinder, time for the platter to rotate to the desired position, and time to transfer the data over the channel connecting the storage device to the associated processor.

Several strategies have been devised to deal with the storage access bottleneck. One such strategy is for each processing element to maintain in its local memory all (or the most frequently accessed part) of the data base. Alternatively, each processor may maintain a different part of the data base in its local memory. This approach handles larger data bases than the previously-mentioned approach but requires the preprocessing of each incoming transaction to direct it to the responsible processing element. This may be difficult to achieve, if for example the query contents do not imply the correct partition or if the data base is large. In yet another approach, replicated disk storage devices with optimizing controllers may be used. In this approach, processing elements send inquiries to an intelligent mass storage controller which assigns the inquiries to a set of mirrored disk drives containing duplicate copies of the data base. The storage controller attempts to minimize the overall average access latency by allocating queries among the various drives to minimize seek time and waiting time for disk rotation across the set of outstanding queries. The speed and volume capacity of this approach for retrieving records are limited by the capability of the intelligent storage controller and by the number and performance of the magnetic disk drives which are attached to the controller.

In short, the foregoing approaches to increasing the capabilities of inquiry and response record handling systems invoke the use of parallel processing and/or parallel storage architectures. These prior art architectures for high performance inquiry and response data base systems have limitations. First, by adding parallelism in processing and storage to increase overall system throughput, a need may be created for a mechanism to coordinate access to and modification of multiple copies of records or other data by the various transactions running on the various processing elements. This need for concurrency control may not be severe for applications where occasional inconsistent views of the data base are tolerable, or where changes to the data base can be queued and executed in batch form to prevent inconsistencies from developing. However, for more general applications, the system overhead incurred in the software mechanisms, which guarantee that each transaction receives a "true" view of the data base and which resolve conflicting attempts to read or write database records, limits the ultimate capacity of the system architectures.

Second, some applications like 800 service in the public telephone network employ data bases with defined structures. A single key (e.g. the dialed 800 number) could be used with a memory resident index to identify the location of the relevant record in storage, avoiding the need to search the entire data base to find the relevant record. For very large data bases, or for data bases which permit access through a number of keys (e.g. by phone number, by name, by address) the memory resident indices themselves may become a significant size component of the overall data base, thus requiring multiple accesses to physical storage to finally retrieve a desired record. Additionally, if "wild card" inquiries occur, i.e. inquiries which require retrieval of records on keys for which no indices were created a priori, then every record in the data base must be retrieved and the contents examined to determine which records satisfy the request. This search process may be enormously demanding on processor real time and may also saturate the storage input output bandwidth if the records reside on disk.

In another prior art approach to record access systems, content addressable storage systems have been implemented to improve efficiency in accessing records from storage. In response to an inquiry, these systems typically read an entire disk cylinder at a time and employ "high performance processors" which examine the output data stream on the fly, identifying and moving to buffers those records whose contents match a particular record request. Some indexing is often required in these systems to identify when possible the set of cylinders likely to contain the requested records. A system of this type is available from the British computer manufacturer ICL; see e.g. "Maller V.A.J. The Content Addressable File Store-CAFS", ICL Technical Journal, Vol. 1, No. 3, November 1979. This type of system permits much shorter response time to arbitrary inquiries than do systems in which a single central processor itself must sort through and retrieve a large number of candidate records. Still, based on one directory assistance benchmark for the ICL system (17 queries/sec), for limited predictable queries, this technology is still inadequate to compete effectively with highly parallel central processor type systems which utilize indexing to enable processing elements to find particular requested records. In short, the above-described inquiry and response system architectures all have limitations on the volume of transactions which can be handled per unit of time.

Accordingly, it is an object of the present invention to provide a new architecture for an inquiry and response data storage access system, which can handle a larger volume of transactions than prior inquiry and response data storage access systems.

SUMMARY OF THE INVENTION

The present invention is an architecture for a storage access system which permits implementation of high capacity query intensive data bases required for mass market public applications such as directory assistance. Since the architecture and processes for managing records, which are defined as associated items of data, also permit the management of files (associated sets of records), the architecture is applicable to high performance multiprocessor computer configurations including networks of diskless workstations.

The physical components of the architecture include one or more record storage "pumps", a high bandwidth distribution medium (e.g. optical fiber) and a plurality of record retrieval elements which serve as interfaces between traditional general purpose computer processing elements and the information present on the distribution medium. The computer processing elements, illustratively enable the user to interact with the architecture.

A data base comprising the records to be accessed is stored in the pump and is transmitted over the distribution medium in a time cyclic fashion, i.e. all records in the data base will be transmitted between time $t_o$ and time $t_o+T$ at which time the cycle will repeat. In some embodiments of the invention, some number of these records may be transmitted multiple times within an interval T. The general purpose user computer processing elements communicate record retrieval requests (resulting from user inquiries) to associated record retrieval elements. The record retrieval elements view all records transmitted on the distribution medium in any time interval T and identify and store those records whose contents contain the specific attributes defined by the specific record retrieval requests. Any request for a record or record set from a particular user processor to a particular record retrieval element can be satisfied (or known to have failed) within about T seconds of receipt of the request, independent of the total number of requests pending. To select files, instead of individual records, each record may include an attribute known as a file identifier; files are retrieved from the storage access system by specifying the file identifier for the desired file. The record retrieval elements will identify and store all records with the specified file identifier, thereby retrieving the desired file. since the processes basic to the operation of the data storage access system apply to sets of records (i.e., files) as well as to individual records, description of the invention will primarily deal with records.

Preferably, the data storage access system architecture will also include an upstream channel from the record retrieval elements to the storage pump and a mechanism at the pump to introduce changed or new records into pump storage. A record management system may also be provided to resolve attempts by different record retrieval elements to "write" changes to the same records. The ability to write into pump storage, however, should not impair the ability to cyclically broadcast the data base contents at high rates.

The broadcast oriented record retrieval architecture has a number of important advantages. These are:

A. Multiprocessor Access to Records

The architecture permits parallel, non-interfering access to the data base by a plurality of user processing elements by broadcasting the entire data base in a cyclical fashion to record retrieval elements associated with the plurality of processors. Thus, each user processor has independent access to the data as though it had a dedicated disk or cache copy of the data base. Yet, only a single physical copy of the data base exists—at the storage pump—greatly reducing the overhead of assuring that each processor has the same view of the data base given to other processors. For record retrieval, the architecture permits an unlimited number of user processors to be attached to the system.

B. Full Content-Addressability of Records

Since the entire data base is viewed by the record retrieval elements, each record retrieval element is able to collect those records whose contents satisfy the specifications provided to it by the associated user processing element. Thus, indices are generally not required. Further, the record access system architecture permits arbitrary inquiries based on any or all field values of a record to be handled easily as those queries based on a single pre-defined key.

As stated previously, access to the data base contents is time-cyclic, with cycle time T. Consequently, a particular request will be satisfied within T seconds, or T/2 seconds, on average. If requests are handled serially by a record retrieval element, then N requests may take as long as T*N seconds to satisfy, which may be too slow in certain applications. Thus, in particular embodiments of the invention, the record retrieval elements should be capable of comparing each record in the broadcast stream with the specifications for many outstanding record requests with apparent simultaneity, thus satisfying each request as soon as within one broadcast cycle time of its arrival.

C. Simplified Consistency Control and Concurrency Management

The basic mechanisms for guaranteeing a consistent view of the data base across the many record retrieval elements and for managing concurrent access to the data base contents are intrinsic to the cyclic nature of the record broadcast mechanism and the content searching capability. These mechanisms, for appropriate applications, provide the simplicity and efficiency of centralized, single copy control systems in a distributed architecture with many parallel processing elements.

DETAILED DESCRIPTION

1. Overview

Figure 1:
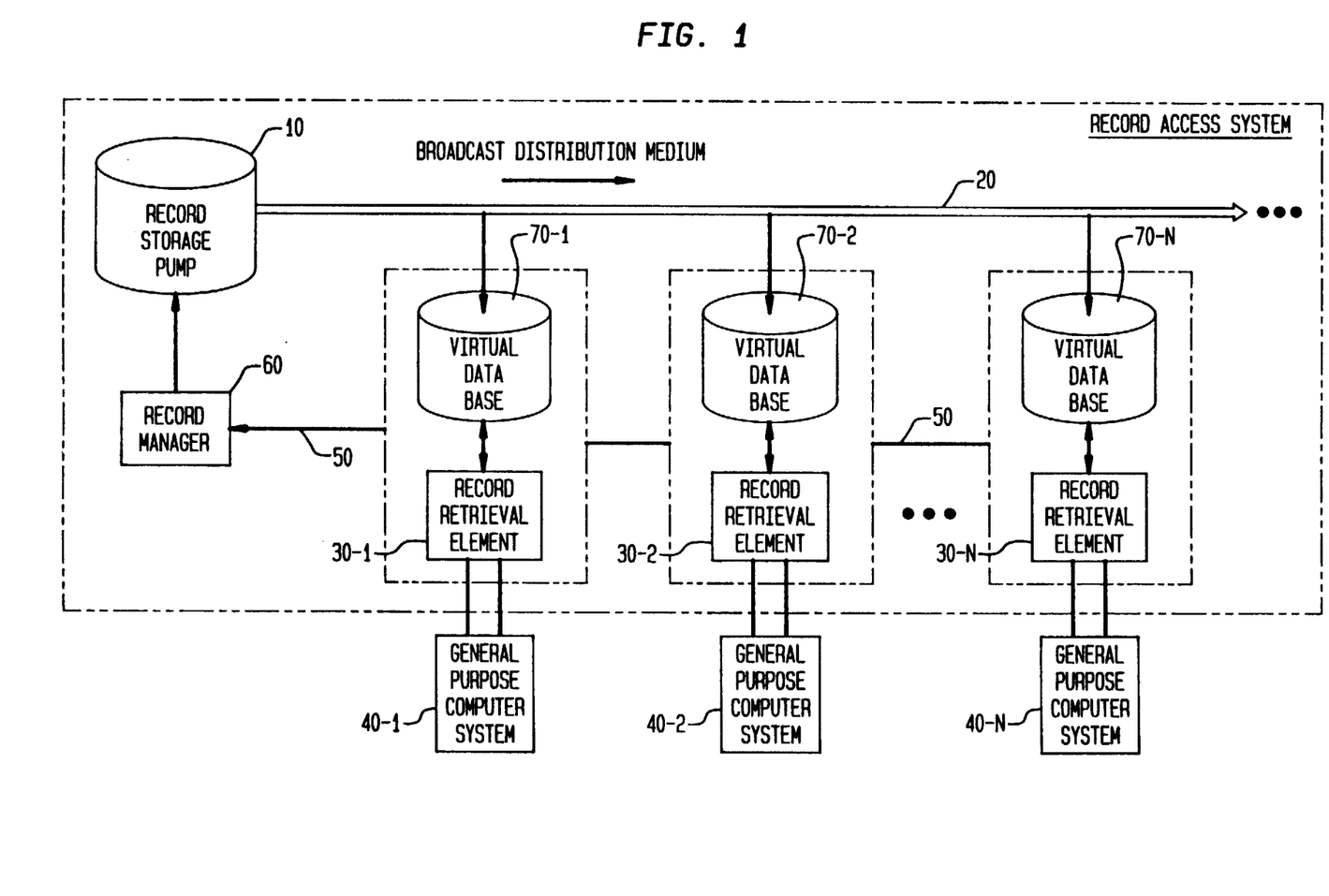
FIG. 1 illustrates a broadcast oriented inquiry-response storage access system architecture in accordance with an illustrative embodiment of the invention.

Turning to FIG. 1, a broadcast oriented inquiry-response record access system is schematically illustrated. The record access system comprises at least one record storage pump 10, a high bandwidth distribution medium (e.g. optical fiber) 20, and a number of record retrieval elements 30-1, 30-2 . . . 30-N which serve as interfaces between the traditional general purpose processing elements 40-1, 40-2 . . . 40-N and the information present on the distribution medium 20. Records are stored in the pump 10 and are transmitted over the distribution medium 20 in a time cyclic fashion, that is, all records will be transmitted between time $t_o$ and time $t_o + T$ at which time, the cycle will repeat. The individual processing elements 40-1, 40-2 . . . 40-N request records from the record retrieval elements 30-1, 30-2, . . . 30-N by specifying one or more content attributes for each desired record or set of records. The record retrieval elements 30-1, 30-2, . . . 30-N view all records transmitted over the distribution medium in any time interval T and identify and store those records whose contents contain the attributes specified in the record requests. Thus, any request for a record or record set can be satisfied, or known to have failed within about T seconds of receipt of the request.

As indicated above, the architecture permits parallel non-interfering access to the data base by many processing elements by broadcasting the entire data base in a cyclical fashion. Thus, each record retrieval element 30 and associated processor 40 has independent access to the data as though it had its own copy of the data base. (In FIG. 1, these virtual copies of the data base are designated 70-1, 70-2 . . . 70-N). However, in reality, in many embodiments of the invention, only a single active copy of the data base exists at the storage pump. Where required, a duplicate copy may be maintained for reliability. The existence of a single active copy greatly reduces the overhead of assuring that each processor has a view of the data base which is both internally consistent and consistent with the view of the data base given to other processors.

The record access systems of FIG. 1 also includes an upstream channel or channels 50 and a record manager 60 for writing record updates from the record retrieval elements 30-1, 30-2 . . . 30-N into the record storage pump 10. The upstream channel bandwidth, which depends on the volume of updates, is generally much smaller than the downstream distribution bandwidth. The record manager 60 serves to write record updates into the storage pump 10 and to resolve attempts by different record retrieval elements to write changes into the same records.

2. Record Storage Pump

Figures 2A, 2B:
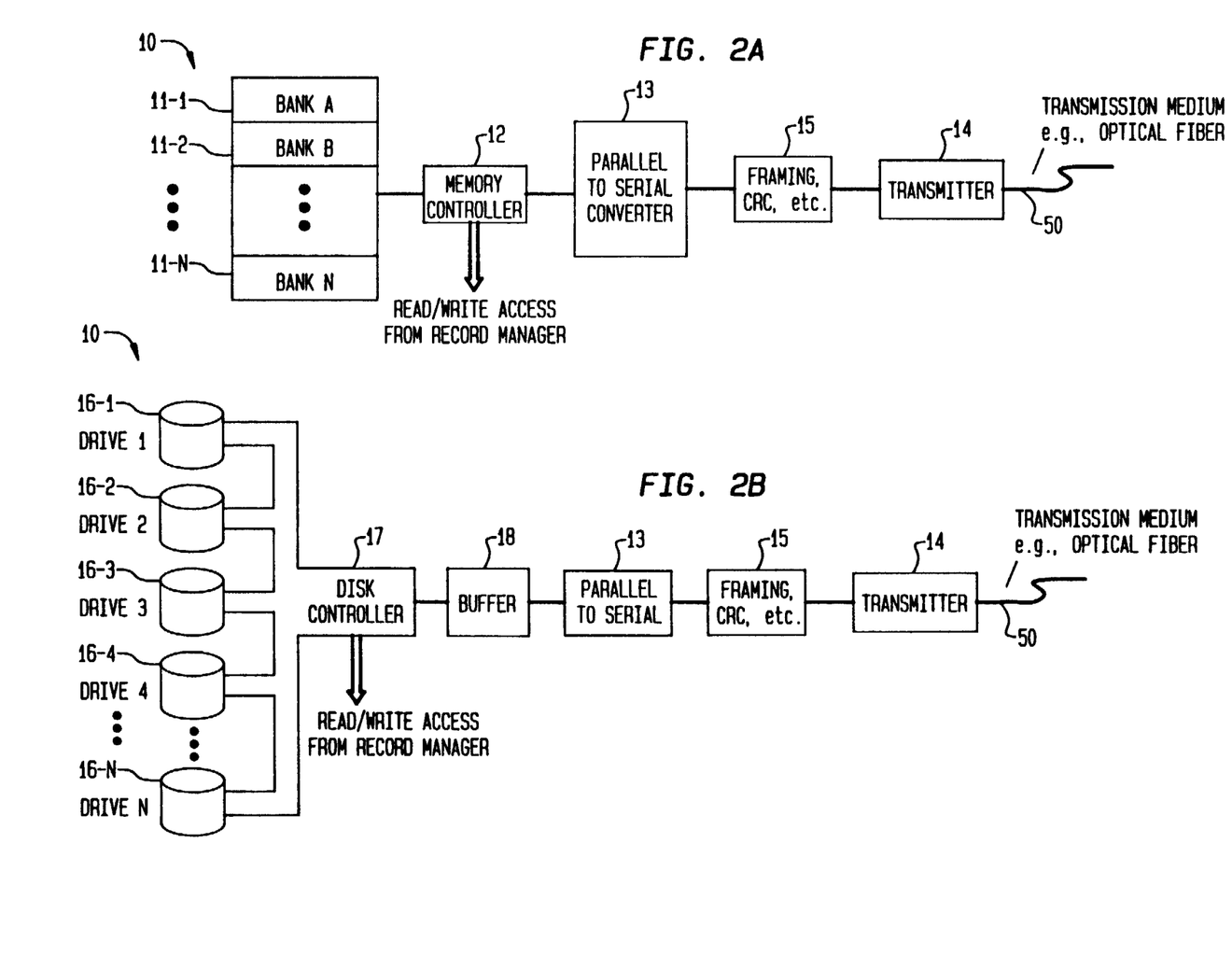
FIGS. 2A, 2B and 2C illustrate three implementations of record storage pumps for use in the system of FIG. 1.

FIG. 2a illustrates a record storage pump 10 which is based on semiconductor memory. The storage system comprises a plurality of interleaved banks of memory 11-1, 11-2 . . . 11-N. The memory banks are interconnected by way of a memory controller 12. The controller 12 cyclically reads the data base from the memory banks to a parallel-to-serial-converter 13, whose output is modulated onto the transmission medium 50 by way of transmitter 14. Conventional circuitry 15 is provided for framing and CRC, if desired, before the data base is transmitted. Word widths in the data base stored in the memory banks 11-1, 11-2 . . . 11-N may be chosen so that memory reads (i.e. broadcasts) can be interleaved with memory writes (for updates). Memory updates are carried out through the memory controller 12 which interfaces with the record manager 60 of FIG. 1.

FIG. 2B shows a storage pump 10 based on magnetic disk technology. More particularly, FIG. 2B shows a plurality of disk drives 16-1, 16-2 . . . 16-N which are cyclically read under the control of disk controller 17. The output from the disk drives are smoothed and multiplexed in a buffer 18. The output of the buffer 18 is fed to the parallel-to-serial-converter 13, whose output is in turn passed through the CRC and framing circuitry 15 and transmitter 14 for transmission over the transmission medium 50. The disk controller 18 also interfaces with the record manager 60 to accomplish record updates.

Figure 2C:
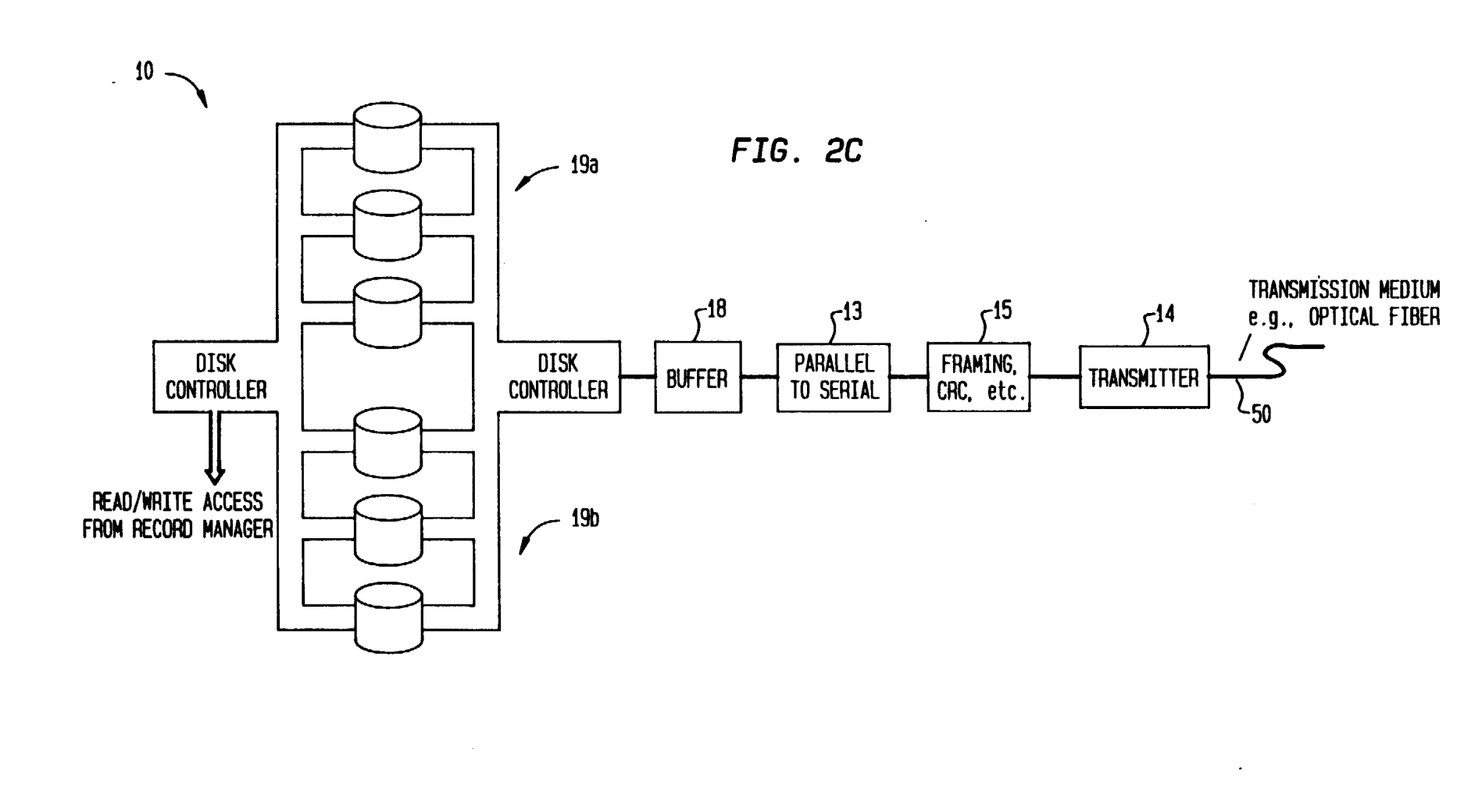

In an alternative magnetic disk scheme shown in FIG. 2C, two multiplexed banks of disks 19a, 19b are accessed on alternate broadcast cycles to reduce any complexities which may result from interleaving reads with and writes to the same disk. Both banks may include the entire data base. Bank 19a is used during broadcast cycle k to transmit the data base contents, while the record manager 60 receives record updates or other write requests requests and inserts them into storage in bank 19b. During broadcast cycle k+1 bank 19b is used to pump the transmission medium 50 with the updated record set, while the record manager 60 receives write requests and updates the contents of bank 19a. Preferably, the record manager 60 incorporates updates received during cycle k well as those received during cycle k+1 in creating the cycle k+2 state of the database in bank 19a.

3. The Record Management Subsystem

The record management subsystem 60 contains the mechanisms which permit the record retrieval elements 30-1 . . . 30-N to update data base contents in an efficient, non-conflicting manner. As discussed above, system overhead for concurrency control (e.g. for insuring that inquiries handled by each of the plurality of processors operate on identical, internally consistent views of the data base) may be significant in prior art distributed processing record access systems. Solutions to this problem in the broadcast record access system disclosed herein build on two features of this architecture. First, in many embodiments of the invention, only a single copy of each record exists, and second, the basic repetition cycle of the data base broadcasts provides an intrinsic synchronizing mechanism.

Write, or update, attempts in the system are passed from a processing element 40-1, 40-2 . . . 40-N (where the application software resides) to its associated record retrieval element 30-1, 30-2 . . . 30-N. The record retrieval element transmits the request along the upstream channel 50. In the simplest case, the upstream channel can be entirely distinct from the broadcast (downstream) channel. This implementation need only provide sufficient bandwidth to handle the update volume. Other implementations may permit record retrieval elements to "write" changes into the downstream channel, with the downstream channel looped around back to the record storage pump 10.

The concurrency management mechanism depends on the requirements of the application. If each update affects only a single record (that is writes are not mutually dependent) and does not depend upon the values of fields in other records, then conflicts resulting from multiple record retrieval elements attempting writes on the same record can be resolved by a central record manager 60 which decides which retrieval element's requests should be honored and makes the required change in storage. On the next data base transmission cycle, all the record retrieval elements can view the new state of the record in question to determine if the write attempts of each were confirmed or rejected. The record retrieval element should pass notice of success or failure of write attempts (along with the new record state) back to its associated application processor 40-1 . . . 40-N, which has responsibility to decide, based on application needs, how the transaction should proceed (reintroduce the write attempt, modify the write attempt, cancel, proceed, etc.). Note that this mechanism guarantees that a write attempt will be confirmed or rejected within about 2T seconds of the attempt—a write attempt in cycle one (T sec., maximum) will be confirmed by the end of cycle 2 (another T seconds). If required, an initial T seconds (maximum) may be required for a confirming "read before write". Thus, the entire read-write-read verify cycle will take between T and 3T seconds.

If writes from a single record retrieval element to several records in the data base are mutually dependent (that is, all or none should be honored) but remain independent of the current values of fields in other records, then the record manager 50 must examine the queue of update requests received in a cycle and, according to an appropriate optimization rule allow an appropriate non-conflicting subset of requests to be entered into record storage at the pump. Again, success or failure will be evident to the record identifiers over the next cycle and the applications can determine how to proceed.

Generalized record locking (i.e. writing an indication in a record that the record is in use or likely to be changed) can be treated in the same fashion as updates. That is, after reading the relevant records in a cycle to determine if they are locked (unavailable), record retrieval elements send lock requests to the record manager 60, which grants a non-conflicting set of requests. Record retrieval elements confirm lock grants by reading the record (the unique ID code of the successful record retrieval element is written into a special field in the targeted record). Still, no record retrieval elements are obstructed from reading locked records and an application processor 40 can determine whether a lock granted to some other processor will affect the success of the local application.

As an alternative to lock-oriented concurrency control mechanisms, so-called optimistic concurrency control schemes can be conveniently implemented in this architecture. In such schemes, applications in any of the plurality of processors obtain records required for a particular user request from the associated record retrieval elements, without reserving use of records by means of locks. When the processing of a user request by an application is complete, the application attempts to "commit" (make final) the transaction by "writing" any record changes into pump storage through the record manager, in the manner described above. Thus, the record manager detects and resolves any conflicting commit attempts received from the various record retrieval elements. Successful write attempts are confirmed by reading the records on the next cycle, in which case the transaction "commits" (becomes final) successfully. If a write attempt fails, the application can decide how to proceed (abort, restart, commit) depending on the specific situation.

Occasionally, one or more records in use by a particular application may have been changed by some other processor between the time the records were read by the application and the time the application attempted to commit the transaction. By defining a record attribute to indicate that some attribute of the record has changed since the prior broadcast cycle (a "modified" field), a mechanism exists to notify applications that values in records they are using have been changed. To accomplish this, in many embodiments of the invention, an application first specifies the desired records along with a "modify notification" to the associated record retrieval element. The record retrieval element obtains the desired records, but then continues to observe subsequent broadcast cycles for the same records, but with the "modified" indication. If such records are observed, they are passed to the application which can abort, restart, or continue, as appropriate. When the application attempts to commit the transaction, the "modify notification" condition is cleared, and the success of the commit attempt depends only on conflicting writes from other processors, as described previously.

Typically, all updates to the data base should be completed before a data base broadcast cycle begins. Thus, the data base in a given broadcast cycle (from Record 1 to Record N) is guaranteed by the record manager to be completely consistent, and all record retrieval elements, therefore, receive an identical, consistent view of the data base. Several implementation options may be used if all updates received during cycle k cannot be introduced into storage in time to be transmitted correctly during cycle $k+1$. For example, a "dead" interval may be included between the end of transmission of Record N, cycle k, and Record 1, cycle $k+1$, with a proportionate inefficiency in use of transmission bandwidth and an increase in response time. Alternatively, updates received during cycle k could be introduced into storage as cycle $k+1$ proceeds, to be viewed by record retrieval elements in cycle $k+2$. This approach may prohibit updates to a record if the record had been changed on the previous cycle. Finally, updates which can not be completed in time can be "dropped" by the record manager—the record retrieval element will detect the failure by reading the record on the next broadcast cycle, and the write can be reattempted. Again, however, no partial updates are permitted—the data base should be internally consistent within a cycle.

Specific implementation of the record manager 60 depends on the volumes of updates or lock requests. The record manager must accumulate update requests, decide which requests to grant, and write the new records into the record pump. Preferably, the record manager 60 maintains a map of the locations of each record in the physical storage of the record pump. A centralized record manager for relatively low update volumes (say, service control point or directory assistance application) may be implemented using conventional general purpose computer technology. If record locking is required for a large proportion of transactions, then the centralized record manager may become the system bottleneck as the transaction volume and number of record retrieval elements and associated processors grows. In this case, a distributed record managing mechanism 60 may be desirable wherein the record retrieval elements themselves jointly make decisions on write and lock requests.

4. Record Retrieval Element

The record retrieval elements 30-1, 30-2 . . . 30-N provide the interface between the general purpose application processors 40-1, 40-2 . . . 40-N and the record access system. Each record retrieval element 30 receives specifications for target records from the associated processor 40, examines the cyclically broadcasted data stream for records satisfying any of the pending requests and then returns a "failed" indication or a "found" indication, with the associated records back to the associated processor 40. Each record retrieval element 30 is also responsible for receiving update or lock requests from the associated processor and for communicating the update and lock requests to the record manager 60. Success or failure of each update attempt is reported back to the associated processor 40. The mechanism for implementing both the read and write or lock confirmation operation is a fast pattern match applied to the broadcast data stream. A fast pattern matching circuit is discussed below.

Figure 3:
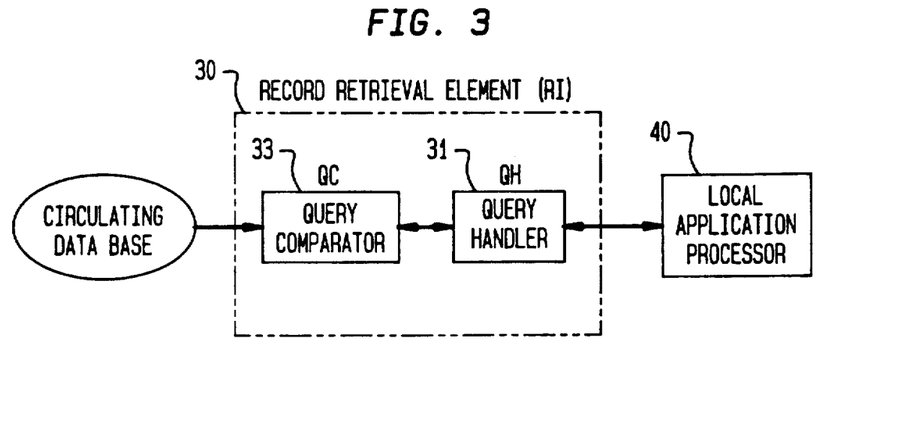
FIG. 3 schematically illustrates a record retrieval element for use in the record access system architecture of FIG. 1.

FIG. 3 is a high level schematic diagram of a record retrieval element 30, that is receiving queries at a fast rate (e.g. 1000 queries/sec). Queries are extracted from the local applications processor 40 by the query handler 31, which query handler is illustratively implemented by way of a general purpose computing machine such as Digital Equipment Corporation's VAX computer. The queries are passed on to the query comparator 33 which compares each query with the incoming data base records, to determine if there are any matches.

Consider for example, a data base comprising one million 100 bit records. Illustratively, the data base is broadcast in its entirety every second, i.e. the transmission speed is 100 megabits/second.

Figure 4:
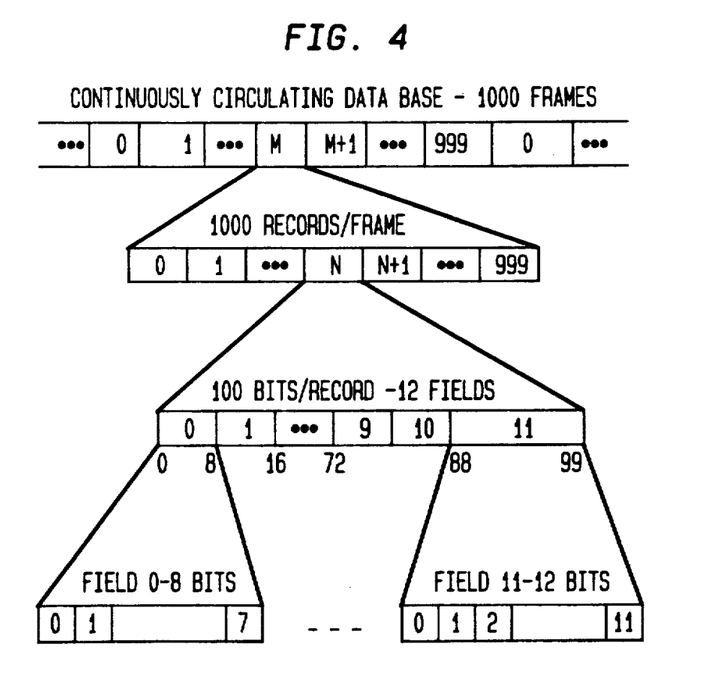
FIG. 4 schematically illustrates the structure of a cyclically broadcast data base for use in the record access system of FIG. 1.

As shown in FIG. 4 the circulating data base is divided into 1000 frames, each frame comprising 1000, one hundred bit records. Each record is divided into a plurality of fields, for example eleven 8 bit fields and one 12 bit field. A specific query may require the query comparator 33 to indicate a valid match if, for example, fields 2, 8, 9 and 10 of the query match the corresponding fields in the particular data base record being compared. In general, the query handler 31 specifies which fields are to be compared and the query comparator 33 uses this information to see if a match has occurred. When a positive match is found, the corresponding query is purged and the query handler 31 is so informed. If a query has been compared with all of the records in the data base and no match if found, the query comparator 33 purges that query and informs the query handler 31 of the options.

To put things in a broader perspective, this type of a system would be used in a network to perform a function equivalent to that performed by the Network Control Point (NCP) for the 800 service today. A caller would give the social security number or name or some other unique attribute of the called party to the central office (CO) associated with the calling terminal. The central office would form a query and send it by way of the local applications processor 40 to the appropriate record retrieval element 30. Typically, one record retrieval element 30 might serve several central offices. The query comparator in the record retrieval element would search the data base records and if a match if found, the local applications processor 40 would return the appropriate information (e.g. a unique network address of the called party) to the CO.

Illustratively, a given query comparator 33 can handle up to twenty or more queries at any given time. In particular implementations, more than one query comparator 33 may be in communication with a particular query handler. The query handler passes a query to a query comparator subject to availability (e.g. maximum limit of 20). Once the query has entered the query comparator, it will be compared with the next incoming data base record and all subsequent records until a match is found or until it has been compared against all records.

The query can enter the query comparator at any point in the data base cycle, but the entering frame is recorded. When all 1000 records in the frame have been completely searched in the next data base cycle and no match is found, the query will be purged and the query handler so informed. This means that a given query may be compared against some records (0 to 1000) twice. This is a direct consequence of the number of frames that the data base is arbitrarily divided into in the query comparator. A larger number of frames will reduce the response time for a no match situation, but it will increase the complexity of the design. This is a tradeoff that needs to be made depending on the response time requirement of a particular system. The number of frames in the data base only effects a given query comparator and different query comparators may assign different values to this parameter if appropriate.

Figure 5:
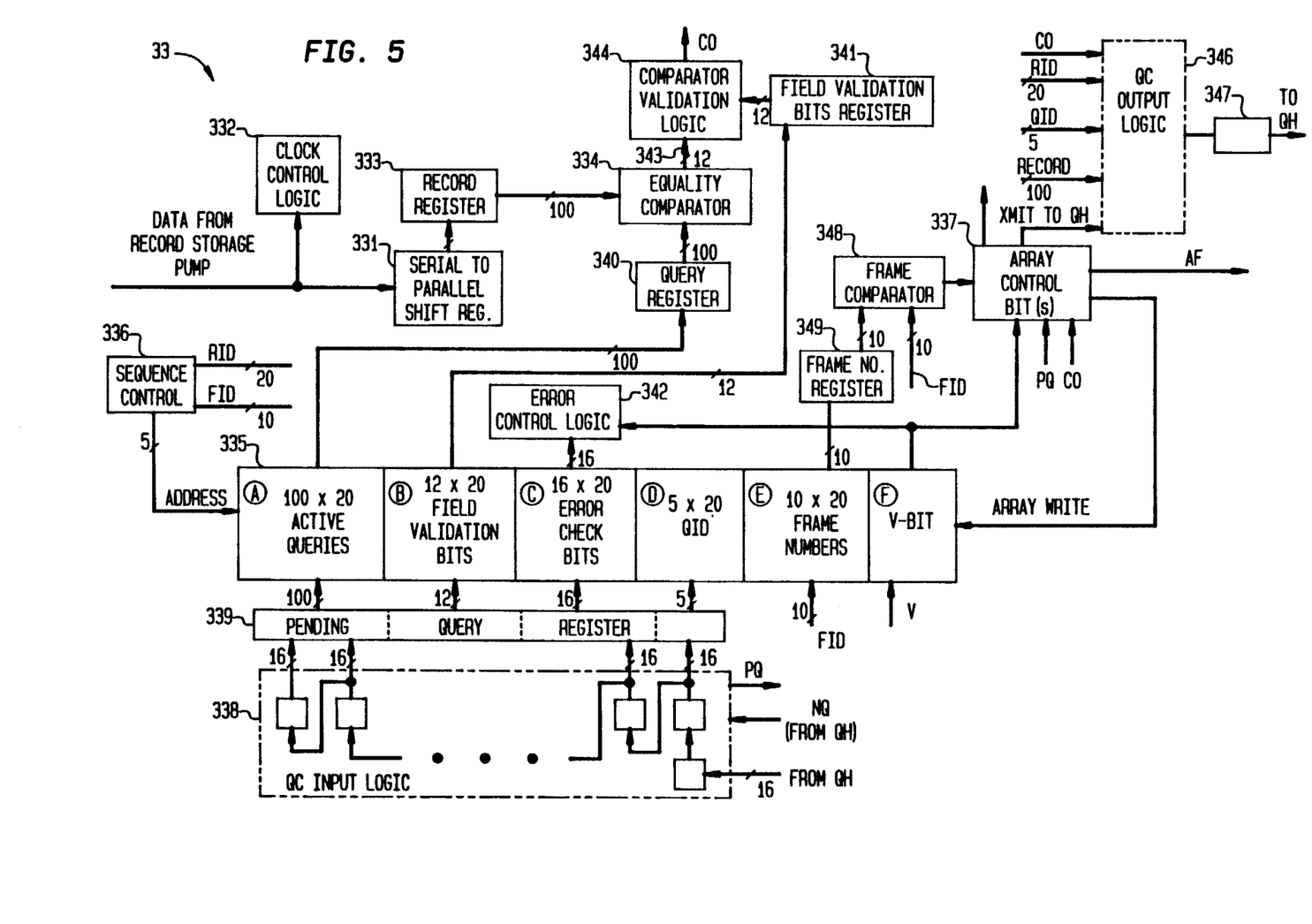
FIG. 5 schematically illustrates a query comparator for use in the record access system of FIG. 1.

Turning to FIG. 5, the query comparator 33 is shown in greater detail. The incoming data stream from the cyclically rebroadcast data base enters the query comparator 33 by way of the serial to parallel shift register 331 and the clock control logic 332. The clock control logic 332 synchronizes the internal timing of the query comparator with the incoming data stream and generates various clocks and synchronizing pulses for internal use by the query comparator 33.

The serial to parallel shift register 331 clocks in the individual records one bit at a time and when an entire record of 100 bits has been clocked in, the record is shifted in parallel to the record register 333. The output of the record register will be used by the equality comparator 334 to compare the data base records with the queries. In the illustrative example discussed herein, the contents of the record register 333 change every 1 microsec. since new records arrive in the query comparator at that rate.

The active query array 335 illustratively has up to twenty active queries. One query is compared with the current record in register 333 every 50 nanoseconds so that all twenty pending queries can be compared with each data base record, in the one microsecond each record is in the register 333. The sequence controller array 336 maintains the address of the query in the active query array 335 currently being compared and updates this address every 50 nanoseconds. The sequence controller also updates the record identification (RID) which is the relative position of the record in the data base every microsecond. The frame identification (FID) is updated every millisecond i.e. after every thousand 1 microsecond record times. The RID is used to send information to the query handler about a record that matched a given query. The FID is used to keep track of frame in which a particular query entered the active query array 335, so that the particular query can be purged from the array if no match if found after the query has been compared with every record in the data base.

Queries are input to the query comparator from the query handler as follows.

The query handler 31 constantly monitors a signal from the active query control register 337 (the array full-AF-signal) to determine if the query comparator 33 is in a state to accept a new query. If this is the situation, the query handler 31 then clocks in the query into the query input logic 338 and when the process is complete, this fact is signaled on the new query (NQ) signal line. Illustratively, the actual query that is to be compared with incoming records comprises 100 bits (field A of the active query array 335). The field validation bits specify which of the 12 fields in the query will be compared with the data base records (field B in the active query array 335). Before sending the query to the query comparator 33, the query handler 31 assigns a 5 bit ID called the QID to each query (field D in the active query register 335). This is a number used to keep track of which query if any matched a given record. To keep track of errors during the transmission of the data and also to check for errors in the array, 16 error check bits are added to the query (field C in the active query register 335). Field E in the active query register 335 is the frame ID of the frame in which the query was clocked into the active query register 335.

Once the query has been fully clocked into the query comparator 33, it is sent to the pending query register 339 and the pending query (PQ) signal is activated. This signal is used in the array control logic 337 to decide precisely when the query should be stored into the active query array 335. When a query is stored in the active query array 335, the current frame number (FID) is stored with it, as indicated above, and a bit (V-bit in FIG. 5) is set indicating that the query entry is a valid one. As mentioned earlier, a new row (i.e. a new query) in the active query array 335 is accessed every 50 ns.

When a particular query is accessed, the 100 bits of the query (field A in the active array 335) are stored in the query register 340, the 12 field validation bits are stored in a separate register 341 and the error check bits are used by error control logic 342 for valid entries to see if there are any errors in the data that was accessed from the active query array 335. Assuming that no error correction is used, if an error is found, the entry would be marked as invalid (using the V bit), the results of the comparator would be ignored and an appropriate message would be sent to the query handler 31. This would cause the query handler 31 to retransmit the query to the query comparator 33.

The contents of the query register 340 are compared with the record register 333 in the equality comparator 334. Each field is compared individually and the output 343 of the comparator 334 comprises 12 bits indicating whether a match was found in each field. This output is used in conjunction with the field validation bits in register 341 to determine when a complete match is found. The comparator output (CO) signal from the comparator validation logic 344 provides this information. If a match was found, the QC output logic 346 uses this information and collects the RID, QID, the record that matched, and possibly some other relevant information and starts sending it to the query handler 31 via buffer 347.

If no match is found between the current query in the query register 340 and the record in the record register 333, then the array control register 337 takes the output of the frame comparator 348 to see if the query has been compared with all records in the data base at least once. (Note, the original frame in which the query entered the query register 335 is received in the frame comparator 349 from field E of the active query array 335 by way of frame number register 349). If the query has not been compared with every record in the data base at least once, then no change will be made in the active query array 335, and nothing will be sent to the query handler 31. If the query has been compared with all records without a successful match, then an indication is sent to the query handler 31 along with the QID. At the same time, the array control register 337 checks the PQ (i.e. pending query) bit in the input logic 338 to see if a query is waiting to enter the system. If a query is indeed pending, then it is written into the array and the V bit is set to indicate a valid query. This query will be compared with the next and subsequent records from the data base. If no query is pending, then the V bit is set to indicate an invalid query so that the comparator cannot make a valid match for this query in future comparisons.

The array control logic 337 keeps track of how many valid queries are in the array. If the active query array 335 is full, then the array full (AF) signal is activated and the query handler 31 monitors this signal before deciding whether to direct any new queries to the query comparator 33.

The query comparator 33 described herein finds the first record that matches a query and reports it to the query handler 31 and then flushes the query from its memory. If the system requirements are changed to include queries of the type 'find all records in the data base that match a given query', then the query comparator 33 can be modified to handle this situation. The only modification required would be to keep the query in the query comparator 33 for a complete data base cycle whether or not a match was found. In this case, all matches detected would be reported to the query handler 31 in the sequence that they were detected. After the query had been matched with every record in the data base, it would be flushed and this fact could be reported to the query handler 31 to provide a confirmation that the query was no longer active in the query comparator 33.

In addition, the query comparator 33 described here is an equality comparator. This would be useful if an exact match of the specified fields was required. If the query were of the type that all records in the data base with specified fields in a given range were to be captured then some changes would be needed in the query comparator 33. The changes are not extensive and are discussed below.

The query handler 31, instead of sending one data block to the query comparator 33 for each query, would send two blocks for every query that required a range comparison. The first block would contain the upper limits of the range fields while the second block would contain the lower limit. Much of the information in the two blocks would be identical. The field validation bits (field B in the active query array 335) would have to be expanded to indicate whether the comparison for a given field was to be an exact match or a range search. For an exact match, the process would be as described earlier. For a range match, two consecutive active query entries would be used. The even entry would indicate an upper limit of the range, the odd entry a lower limit. The equality comparator 334 would be modified to generate an equal, less than and greater than signal. For range queries, the even entry would trigger only the equal or less than response on specified fields. The odd query would trigger the greater than or equal response. The comparator validation logic 344 would be modified to keep track of the type of query request. For range queries, the CO signal from comparator validation logic 344 would generally not be activated during the even cycle. Results from the comparison of the even cycle would be saved and compared with results from the odd cycle. If, for all specified fields, the even cycle indicated less than or equal comparison and for the odd cycle a greater than or equal comparison were indicated, then the CO signal would be activated.

Figure 6:
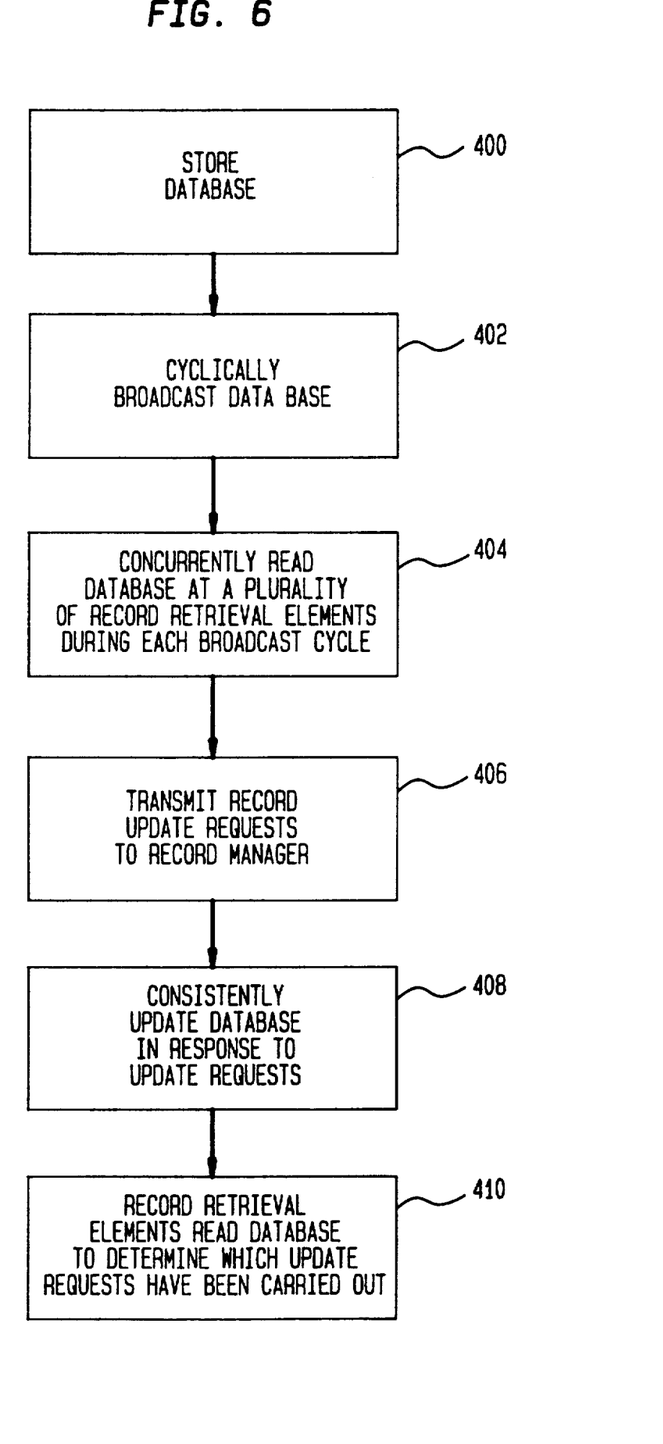
FIG. 6 is a flow chart which schematically illustrates a method for retrieving records from a data base and for updating the data base, in accordance with an illustrative embodiment of the present invention.

The method for retrieving records from a data base and for updating the data base is summarized below in connection with the flow chart of FIG. 6. In an illustrative embodiment of the invention, a data base comprising a plurality of records is stored in a memory (step 400). The data base is cyclically broadcast to a plurality of record retrieval elements (step 402). More particularly, during each broadcast cycle, the records comprising the data base are broadcast via a downstream channel to the record retrieval elements. During each broadcast cycle, the records comprising the data base are concurrently read by the record retrieval elements and particular records may be identified based on content attributes (step 404). After reading particular records during a specific broadcast cycle, each processor may transmit one or more record update requests to the record manager (step 406). In response to the record update requests received during or after a particular broadcast cycle, the data base is updated consistently (step 408). This means, for example, that if conflicting update requests with respect to a record are received from two different record retrieval elements only one can be carried out. During a broadcast cycle subsequent to the specific broadcast cycle, a record retrieval element can read the data base to determine if its update requests were carried out (step 410).

Illustratively, the data base is read concurrently by the record retrieval elements during a specific broadcast cycle lasting T seconds. A consistent set of update requests is carried out during the first following broadcast cycle of T seconds and each record retrieval element can read the data base to check if its update requests were carried out during the second following broadcast cycle of T seconds. Thus, an entire read-write-read procedure takes no more than 3T seconds.

Finally, the above described embodiments of the invention are intended to be illustrative only. Numerous alternative embodiments may be desired by those skilled in the art, without departing from the spirit and scope of the following claims.

What is claimed is:

1. In an architecture comprising a memory for storing a database, means for cyclically broadcasting the database over a downstream transmission channel, a plurality of processing elements located along the downstream channel for reading the database during each broadcast cycle, an upstream channel via which information is transmitted from said processing elements to said memory, and update means in communication with said upstream channel and said memory, a method for concurrently performing a plurality of queries comprising the steps of maintaining in said memory a database comprising a plurality of records, each of which record comprises a plurality of fields, cyclically broadcasting via said downstream channel said database, at said processing elements, concurrently executing a plurality of queries on said database by accessing particular records from said database using content addressing by the steps of at each processing element, successively storing each record of said database during each broadcast cycle of said database, at each processing element, storing one or more content attributes associated with each query to be executed at the processing element, at each processing element, comparing said content attributes stored therein with the contents of one or more fields of each of said records stored in the processing element during each broadcast cycle, and indicating when a query is satisfied by one of said records, transmitting update requests of records identified in response to said queries from said processing elements via said upstream channel to said update means, and updating said database maintained in said memory in a non-conflicting manner in response to said update requests by using said update means to receive said update request and to resolve conflicts among said update requests.

2. An access system for a stored database comprising a plurality of records, said access system comprising a memory for storing a database comprising a plurality of records, each of which records comprises a plurality of fields, broadcasting means for cyclically broadcasting said database over a downstream transmission channel so that during each successive broadcast cycle of said database the records of the database are transmitted over said downstream channel, a plurality of processing elements which do not directly communicate with one another and which are located along said downstream transmission channel for concurrently reading the database during each broadcast cycle and for executing queries by identifying particular records in said database using content addressing, each of said processing elements comprising record storage means for successively storing each record of the database during each broadcast cycle of the database, content attribute storage means for storing at least one content attribute associated with a query, comparing means for comparing said at least one content attribute with the contents of one or more fields of each of said records while each of said records is stored in said record storage means, and means responsive to said comparing means for indicating when a query is satisfied by one of said records, an upstream channel in communication with said processing elements for transmitting record update requests from said processing elements, update means in communication with said memory and said upstream channel for receiving said update requests, for resolving conflicts among said update requests, and for carrying out said update requests to update said database in a non-conflicting manner.

* * * * *